United States Patent [19]

Shiba

[11] Patent Number: 4,928,044
[45] Date of Patent: May 22, 1990

[54] SPINDLE MOTOR STOP CONTROL DEVICE

[75] Inventor: Takahumi Shiba, Saitama, Japan

[73] Assignee: Pioneer Electronic Corporation, Tokyo, Japan

[21] Appl. No.: 285,973

[22] Filed: Dec. 19, 1988

[30] Foreign Application Priority Data

Dec. 19, 1987 [JP] Japan .................................. 62-322507

[51] Int. Cl.$^5$ .............................................. H02K 5/00
[52] U.S. Cl. ...................................... 318/364; 318/362
[58] Field of Search .................................. 318/362–369, 318/65, 258, 261, 264, 265–267, 269, 273, 278, 280–286, 256–258, 254–255, 139, 138, 600–603, 626, 86–88; 388/801–807, 803–805, 809–814; 360/74.1

[56] References Cited

U.S. PATENT DOCUMENTS

| | | | |
|---|---|---|---|
| 3,868,557 | 2/1975 | Scott | 318/685 X |
| 3,968,414 | 7/1976 | Konrod | 318/139 X |
| 4,325,011 | 4/1982 | Peterson | 318/139 |
| 4,468,599 | 8/1984 | Berman et al. | 318/362 |
| 4,546,298 | 10/1985 | Wickham et al. | 318/362 X |
| 4,587,468 | 5/1986 | Hutta | 318/362 |
| 4,604,655 | 8/1986 | Moriyama | 358/343 |
| 4,742,282 | 5/1988 | Okutani et al. | 318/362 X |
| 4,761,692 | 8/1988 | Yoshida et al. | 358/335 |
| 4,768,104 | 8/1988 | Kanamaru | 358/342 |
| 4,782,402 | 11/1988 | Kanamaru | 358/343 |

*Primary Examiner*—William M. Shoop, Jr.
*Assistant Examiner*—D. Martin
*Attorney, Agent, or Firm*—Sughrue, Mion, Zinn, Macpeak & Seas

[57] ABSTRACT

A spindle motor stop control device applies a reverse torque braking force to the spindle motor to effect stopping of the motor. A speed detector detects when the number of rotation of the motor has slowed to 1/n of a predetermined number of rotation and issues a detection signal. The time period beginning with the application of the reverse torque braking force until the issuance of the detection signal is measured. Then, a time period $t = T/(n-1)$ is calculated and the reverse torque braking force is continued for the time, t, and then removed.

4 Claims, 2 Drawing Sheets

SPINDLE MOTOR STOP CONTROL DEVICE

BACKGROUND OF THE INVENTION

1. Field of the Invention

This invention relates to spindle motor stop control devices, and more particularly to a device for stopping a spindle motor which rotates at high speed.

2. Background Art

In a conventional spindle motor stop control device, a frequency generator (FG) operating in association with the spindle motor is used to detect the motor speed. That is, the speed of the spindle motor is detected from the output of the frequency generator, so that, according to the speed of the spindle motor, a reverse torque braking force is applied to the spindle motor thereby to stop the latter. However, the conventional device is disadvantageous in that the frequency generator is expensive, and the use of the expensive frequency generator for only the stop control of the spindle motor is not economical.

To overcome this difficulty the following method has been employed: After reverse torque braking force is applied to the spindle motor, the speed of the latter is monitored, and the application of the reverse torque braking force is allowed to last for a predetermined period of time t from the time instant that the speed of the spindle motor is decreased to a predetermined value. This method in effective in the playing of a CAV (constant angular velocity) disc. However, it is not so effective in the playing of a CLV (constant linear velocity) disc. That is, in the case of a CLV disc, the speed of rotation of the spindle motor is changed as the pickup is moved radially of the disc, and therefore the predetermined period of time t described above is set according to the speed of rotation of the spindle motor provided when the pickup is moved to the middle point radially of the disc. Accordingly, when the pickup is located in the inner region of the disc, the period of time is not long enough; that is, the application of the reverse torque braking force is insufficient, and it is too long when the pickup is located in the outer region of the disc, so that it is impossible to suitably stop the spindle motor.

SUMMARY OF THE INVENTION

In view of the foregoing, an object of this invention is to provide a spindle motor stop control device which, being simple in circuitry, can stop the spindle motor quickly and positively.

In the spindle motor stop control according to the invention, in stopping the spindle motor by application of a reverse torque braking force thereto, it is detected when the speed of rotation of the spindle motor is decreased to 1/n of a value present therefor, and a time interval T, which elapses from the time instant that the reverse torque braking force is applied to the spindle motor until the detection signal is outputted, is measured, to calculate a period of time t which is a function of the time interval T, and the application of the reverse torque braking force is allowed to last for the period of time t from the time of production of the detection signal.

DETAILED DESCRIPTION OF A PREFERRED EMBODIMENT OF THE INVENTION

One preferred embodiment of this invention will be described with reference to the accompanying drawings.

Figure 1:
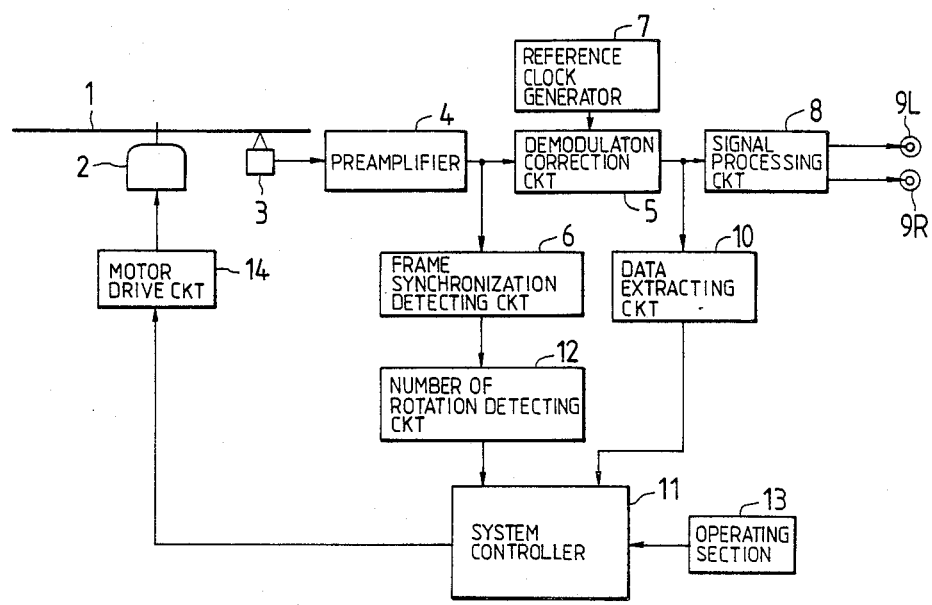
FIG. 1 is a block diagram outlining the arrangement of a disc player having a spindle motor stop control device according to this invention.

FIG. 1 is a block diagram outlining the arrangement of a disc player with a spindle motor stop control device according to the invention. In FIG. 1, a disc 1 is rotated by a spindle motor 2, and its recorded data are read with an optical pickup 3. The optical pickup 3 comprises: a light source, namely a laser diode; an optical system including an objective lens; a photo detector for receiving a light beam reflected from the disc 1; a focus actuator for controlling the position of the optical axis of the objective lens with respect to the data recording surface of the disc 1; and a tracking actuator for controlling the position of the spot of the light beam in a radial direction of the disc which is applied to the recording track by the pickup 3 with respect to the recording track.

The read output of the pickup 3 is applied through a preamplifier 4 to a demodulation/correction circuit 5 and a frame synchronization detecting circuit 6. The circuit 5 subjects the read output; i.e., an EFM (eight to fourteen modulation) signal to EFM demodulation and writes it in a memory (not shown) such as a RAM, and, with the aid of a reference clock pulse signal from a reference clock generator 7, controls the memory, to perform the deinterleaving of data and an error correction by using the parity bits in the data. The digital audio signal demodulated and corrected by the circuit 5 is supplied to a data extracting circuit 10 and to a signal processing circuit 8 comprising a D/A (digital-to-analog) converter and a deglitcher where it is processed. The output of the signal processing circuit 8 is applied to a right channel audio output terminal 9R and a left channel audio output terminal 9L. The data extracting circuit 10 operates to extract subcode data, and the data thus extracted is applied to a system controller 11.

The frame synchronization detecting circuit 6 is to detect the read output frame synchronization signals recorded on the disc with a predetermined period. The pulse width of the frame synchronization signals is 22T (where T=1/8.6436 MHz) when the disc is rotated at a predetermined number of rotation. The disc player further comprises a number of rotation (rpm) detecting circuit 12 which utilizes the pulse width to detect the speed of the spindle motor 2. The detecting circuit 12 outputs a detection signal when the speed of the spindle motor 2 is decreased, for instance, to about one-third of the predetermined value; that is, when the frame synchronization signal pulse width is increased from 22T to 64T (about three times as large as 22T). The detection signal thus outputted is applied to the system controller 11.

The system controller 11 comprising a microcomputer performs various control operations according to instructions from an operating section 13, and controls a motor drive circuit 14 to carry out the drive and stop controls of the spindle motor 2.

Figure 2:
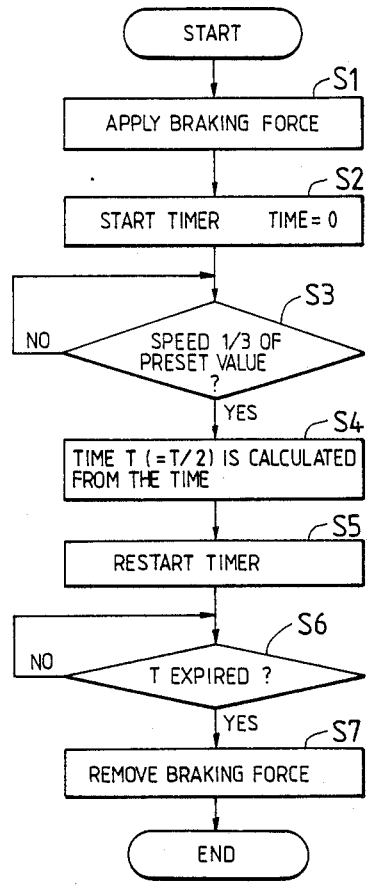
FIG. 2 is a flow chart showing one example of the control procedure for stopping a spindle motor which is carried out by a processor in the system controller shown in FIG. 1.

Now, the control procedure carried out by the processor in the system controller when the spindle motor 2 is at rest will be described with reference to a flow chart shown in FIG. 2.

When, from the output data of the data extracting circuit 10, it is detected that the specified last piece of music has been performed in a program music performance mode or when the last piece of music has been performed in an ordinary music performance mode, or when the operating section 13 issues a performance stop instruction, the processor controls the motor drive circuit 14 so that a negative drive voltage is applied to the spindle motor 2 to apply a reverse torque braking force to the motor 2 (Step S1), and then the processor starts a timer incorporated therein (Step S2). The processor monitors the input from the number of rotation detecting circuit 12 to determine whether or not the number of rotation of the spindle motor 2 is decreased to about one-third ($\frac{1}{3}$) of the predetermined value (rpm) (Step S3). When it is detected from the detection signal of the number of rotation detecting circuit 12 that the number of rotation of the spindle motor 2 has been decreased to about one-third of the predetermined value, a time t (=T/2) is calculated from the time interval which elapses from the time instant that the reverse torque braking force is applied to the spindle motor until the detection signal is produced; that is, the count value T of the timer mentioned above (Step S4). It is necessary to adjust the time t by adding a predetermined value a thereto or subtracting it therefrom, as the case may be. Then, the timer is started again (Step S5), and the lapse of the time t thus calculated is monitored (Step S6). Upon detection of the lapse of the time t, the processor controls the motor drive circuit 14 to suspend the application of the reverse torque braking force to the spindle motor 2 (Step S7).

Figure 3:
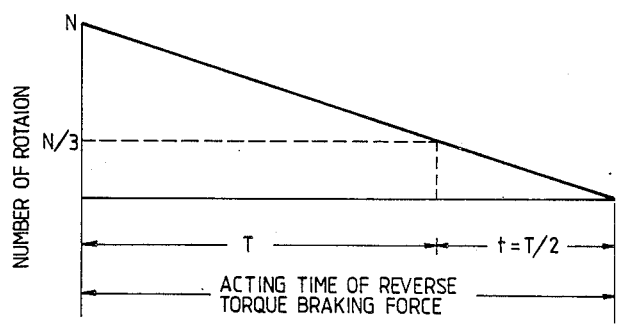
FIG. 3 is a graphical representation showing, in the case where a reverse torque braking force is applied to a rotating object, the proportional relation between time T and number of rotation (r.p.m.) N.

As was described above, in the invention, in stopping the spindle motor 2 by application of the reverse torque braking force thereto, it is detected when the number of rotation of the spindle motor is decreased, for instance, to one-third of the predetermined value, the time interval which elapsed from the time instant that the reverse torque braking force is applied to the spindle torque until the detection signal is outputted is measured to calculate the time t (=T/2), and the application of the reverse torque braking force is allowed to last as long as the time t from the production of the detection output by the number of rotation detecting circuit. Therefore, even in the playing of an CLV disc, the spindle motor 2 can be quickly and positively stopped independently of the number of rotation of the spindle motor at the application of the reverse torque braking force This is based on the fact that, when a reverse torque braking force acts on an object rotating with a moment of inertia, its number of rotation (rpm) is proportional to the lapse of time as shown in FIG. 3.

In the above-described embodiment, the time interval T required for the number of rotation of the spindle motor 2 to decrease to one-third of the specified value is measured, and the time t are calculated from the value T (t=T/2). However, it should be noted that the invention is not limited thereto or thereby. That is, generally stated, a time interval T required for the number of rotation of the spindle motor 2 to decrease to 1/n (where n is not limited to integer numbers only) of the specified value is measured, and a period of time t is calculated from the time interval T thus measured according to the equation $t=T/(n-1)$, and the application of the reverse torque braking force is allowed to last as long as the period of time t from the production of the above-described detection signal.

Figure 4:
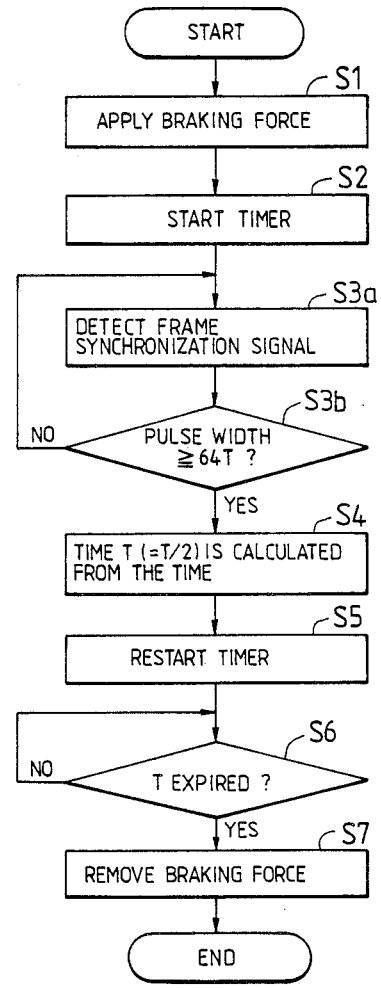
FIG. 4 is a flow chart showing another example of the control procedure for stopping the spindle motor.

In the above-described embodiment, the number of rotation detecting circuit 12 has its own block in FIG. 1, and the frame synchronization signal's pulse width is detected by hardware. However, it goes without saying that the controller 11 may have the function of the number of rotation detecting circuit 12, to detect the frame synchronization signal's pulse width by software. In this case, the processor operates is as shown in FIG. 4; that is, instead of Step 3 shown in FIG. 3, Steps S3a and S3b are carried out. More specifically, after the start of the timer, the processor receives a frame synchronization signal from the frame synchronization detecting circuit 6 (Step S3a), to determine whether or not the frame synchronization signal's pulse width is 64T or more (Step S3b). As a result, it can be determined, whether or not the speed of the spindle motor 2 has been decreased to one-third or less of the specified value.

As was described above, with the spindle motor stop control device of the invention, in stopping the spindle motor by application of tho reverse torque braking force thereto, it is detected when the number of rotation of the spindle motor has been decreased to 1/n of the specified value, and the time interval T which elapses from the time instant that the reverse torque braking force is applied to the spindle motor until the detection output is produced is detected to calculate the period of time t which is the function of the time interval T, so that the application of the reverse torque braking force is allowed to last for the period of time t from the time of production of the detection signal. Therefore, according to the invention, even in the playing of a CLV disc, the spindle motor can be quickly and positively stopped with the simple circuit described above, without using an expensive frequency generator.

What is claimed is:

1. A spindle motor stop control device for applying a reverse torque braking force to a spindle motor for rotating a data record disc comprising:
   number of rotation detecting means for detecting and outputting a detection signal when the number of rotation of said spindle motor has decreased to a fraction (1/n) of a predetermined value in response to the reverse torque braking force;
   measuring means for measuring the time interval, T between the time instant that said reverse torque braking force is applied to said spindle motor and the time that said detection signal is outputted;
   arithmetic means for calculating a period of time t which is a function of said time interval T, and
   means for continuing the application of said reverse torque braking force for the period of time t from the time of production of said detection signal.

2. In a spindle motor stop control device as claimed in claim 1, wherein said arithmetic means includes means for calculating the time period, t, from the function $t=T/(n-1)$.

3. In a spindle motor stop control device as claimed in claim 1, wherein said number of rotation detecting means comprises a frame synch signal detector responsive to a frame synch signal reproduced from the data record disc rotated by said spindle motor and an rpm detector responsive to said frame synch signal detector.

4. In a spindle motor stop control device as claimed in claim 1, wherein said number of rotation detecting means comprises a frame synch signal detector for detecting a frame synch signal reproduced from the data record disc rotated by said spindle motor, and means for detecting when the duration of said detected frame synch signal is at least a predetermined multiple of the duration of the frame synch signal when the spindle speed is at said predetermined value.

* * * * *